US008092722B2

(12) United States Patent
O'Brien et al.

(10) Patent No.: US 8,092,722 B2
(45) Date of Patent: Jan. 10, 2012

(54) VARNISH COMPOSITIONS FOR ELECTRICAL INSULATION AND METHOD OF USING THE SAME (75) Inventors: Michael J. O'Brien, Clifton Park, NY (US); Patricia Chapman Irwin, Altamont, NY (US); Qiwei Lu, Seven Hills, OH (US)

(73) Assignee: Sabic Innovative Plastics IP B.V. (NL)

( * ) Notice: Subject to any disclaimer, the term of this patent is extended or adjusted under 35 U.S.C. 154(b) by 387 days.

(21) Appl. No.: 12/241,296

(22) Filed: Sep. 30, 2008

(65) Prior Publication Data

US 2010/0080892 A1 Apr. 1, 2010

(51) Int. Cl.
*H01B 3/20* (2006.01)

(52) U.S. Cl. ........................ 252/578; 427/104; 427/385.5

(58) Field of Classification Search .................. 427/104, 427/385.5; 252/578
See application file for complete search history.

(56) References Cited

U.S. PATENT DOCUMENTS

| 3,306,875 | A |   | 2/1967  | Hay              |         |
|-----------|---|---|---------|------------------|---------|
| 3,835,200 | A | * | 9/1974  | Lee, Jr.         | 524/504 |
| 3,996,307 | A | * | 12/1976 | Najvar et al.    | 525/482 |
| 4,866,126 | A | * | 9/1989  | Mylonakis et al. | 525/68  |
| 4,923,932 | A |   | 5/1990  | Katayose et al.  |         |
| 5,744,068 | A | * | 4/1998  | Bailly et al.    | 525/391 |
| 6,306,953 | B1 | * | 10/2001 | Fortuyn et al.  | 524/508 |
| 6,521,703 | B2 |  | 2/2003  | Zarnoch et al.   |         |
| 6,897,282 | B2 |   | 5/2005  | Freshour et al.  |         |
| 7,329,708 | B2 |   | 2/2008  | Birsak et al.    |         |
| 2001/0053450 | A1 |   | 12/2001 | Yeager et al. |         |
| 2004/0106750 | A1 | * | 6/2004  | Yeager et al. | 525/502 |
| 2004/0146692 | A1 |   | 7/2004  | Inoue et al.  |         |
| 2006/0038324 | A1 |   | 2/2006  | Yeager et al. |         |
| 2007/0066710 | A1 | * | 3/2007  | Peters et al. | 523/160 |
| 2007/0078236 | A1 | * | 4/2007  | Bonnet et al. | 525/529 |

FOREIGN PATENT DOCUMENTS

EP 835911 A1 4/1998

OTHER PUBLICATIONS

JP4366165A; Dec. 18, 1992; Abstract Only also published as JP3004868B2.
International Search Report; International Application No. PCT/US2009/057061; International Filing Date Sep. 16, 2009; 9 pages.
Written Opinion of the International Searching Authority; International Application No. PCT/US2009/057061; International Filing Date Sep. 16, 2009; 5 pages.

* cited by examiner

*Primary Examiner* — Dah-Wei Yuan
*Assistant Examiner* — Robert S Walters, Jr.
(74) *Attorney, Agent, or Firm* — Cantor Colburn LLP (57) ABSTRACT

A varnish composition for producing an electrically insulative thermoset coating is disclosed. The varnish composition comprises a functionalized poly(phenylene ether), an unsaturated polyester, and/or a vinylester resin. The varnish composition further comprises a reactive liquid monomer and a block copolymer comprising a poly(olefin) block, or a poly (diolefin) block, and at least one terminal poly(alkenyl aromatic) block comprising repeat units derived from an alkenyl aromatic monomer. When cured, the polymers and reactive liquid monomer forms an electrically insulative thermoset that provides superior crack resistance.

16 Claims, 1 Drawing Sheet

VARNISH COMPOSITIONS FOR ELECTRICAL INSULATION AND METHOD OF USING THE SAME

FIELD OF THE INVENTION

The present invention is directed to varnish compositions for insulating electrical machinery comprising a poly(phenylene ether), an unsaturated polyester, and/or vinylester resin, a reactive liquid diluent, and a block copolymer that provides superior crack resistance during use.

BACKGROUND OF THE INVENTION

Although the stator windings of electrical inductive devices, such as motors, are wound with magnet wire having enamel or other insulative coating thereon, it is often desirable to further coat the windings and seal them from the environment. When the motor is used in environments where the stator windings are exposed to moisture or abrasive materials, such as sand and dirt, it is often desirable to further protect the stator windings from the environment by means of an additional coating. For example, protection of the stator windings is desirable in blower motors utilized in the cooling systems for locomotive traction motors. Protection is also desirable in open motors utilized in driving pumps in oil field applications, which are exposed directly to blowing sand and dirt, as well as moisture.

Conventional curable varnish compositions, such as those used in certain locomotive traction motors, are so-called "solventless" varnishes based on unsaturated polyester resin (UPR). These varnish systems, however, tend to chip or crack, particularly when subjected to vibrations accompanying locomotive operation, which may result in more frequent maintenance intervals than desired.

What is needed is a varnish composition that can better withstand the operating conditions during use that cause cracking or chipping of the varnish and a method for electrically insulating electrical devices with the varnish composition.

SUMMARY OF THE INVENTION

Disclosed is a curable composition comprising: a functionalized poly(phenylene ether), an unsaturated polyester, and/or a vinylester resin, a reactive liquid monomer; and a block copolymer comprising a poly(olefin) block comprising repeat units derived from a $C_2$-$C_4$ olefinic monomer or a poly(diolefin) block comprising repeat units derived from a $C_4$-$C_6$ diolefinic monomer and at least one terminal poly(alkenyl aromatic) block comprising repeat units derived from an alkenyl aromatic monomer.

Also disclosed is a method for electrically insulating a motor using a varnish composition comprising providing a component of a motor, applying a varnish composition as described above to the motor component, and curing the varnish composition to form an electrically insulative thermoset coating over the motor component.

These and other features, aspects, and advantages of the present invention will become better understood when the following detailed description is read with reference to the accompanying FIGURE.

BRIEF DESCRIPTION OF THE DRAWING

The FIGURE shows the crack resistance of a varnish according to Examples 1 to 5 below (FIGS. 1B to 1F) and a Comparative Example 1 (FIG. 1A), evaluated by a hex nut cracking test.

DETAILED DESCRIPTION OF EXEMPLARY EMBODIMENTS

In some embodiments, the curable composition can comprise only one of a functionalized poly(phenylene ether), an unsaturated polyester, or a vinylester resin as curable polymers. In other embodiments, the curable composition can comprise any two of the three curable polymers or all three of the curable polymers. Thus, the curable composition can also comprise a functionalized poly(phenylene ether) in combination with an unsaturated polyester, a functionalized poly(phenylene ether) in combination with a vinylester resin, or a functionalized poly(phenylene ether) in combination with both an unsaturated polyester and a vinylester resin. The curable composition further comprises a reactive liquid monomer and a block copolymer as described herein. In some embodiments, the curable composition can comprise, alone or in a blend, a low intrinsic viscosity (IV) functionalized poly(phenylene ether), a reactive liquid monomer, and a block copolymer as described herein. The reactive liquid monomer can participate in a free radical or chain reaction when the curable composition is cured.

The functionalized poly(phenylene ether) in the curable composition can have at least one unsaturated group and can have an intrinsic viscosity of about 0.06 to about 0.25 deciliter per gram, specifically about 0.09 to 0.15 deciliter per gram, measured in chloroform at 25° C.

According to another exemplary embodiment, a composition comprises a blend of an unsaturated polyester resin and a low intrinsic viscosity (IV) functionalized poly(phenylene ether), a reactive liquid monomer, a block copolymer, and a reactive liquid monomer, wherein the functionalized poly(phenylene ether) is within the above-specified intrinsic viscosity ranges and wherein the composition, when cured, has a glass transition temperature higher than about 75° C., specifically 100 to 165° C.

The block copolymer employed in the curable composition comprises a poly(olefin) block comprising repeat units derived from a $C_2$-$C_4$ olefinic monomer, or a poly(diolefin) block comprising repeat units derived from a $C_4$-$C_6$ diolefinic monomer, and at least one terminal poly(alkenyl aromatic) block comprising repeat units derived from an alkenyl aromatic monomer. Specifically, the poly(alkenyl aromatic) block can be greater than or equal to 10 wt. % by weight of the block copolymer, more specifically 10 to 50 wt. %. Still more specifically, the block copolymer can comprise greater than or equal to 30 wt. % weight of a block derived from an alkenyl aromatic monomer. For example, a poly(olefin) block can comprise repeat units derived from ethylene, isoprene, or butane, and a poly(diolefin) block can comprise repeat units of butadiene. An alkenyl aromatic monomer can comprise repeat units, for example, derived from styrene.

The poly(alkenyl aromatic) block can comprise, for example, a block derived from a monomer represented by the following structure:

wherein $R^{11}$ is hydrogen, lower alkyl having from 1 to 7 carbon atoms, or halogen; $Z^1$ is halogen or lower alkyl having from 1 to 7 carbon atoms; and p is from 1 to 5.

In one embodiment, the curable composition comprises a block copolymer that is a triblock copolymer having three blocks of at least two different monomeric compositions. In the case of three blocks, two of the blocks can be based on the same monomer or each of the three blocks can consist of three different monomeric compositions. For example, in one embodiment, the block copolymer is a linear triblock copolymer comprising two terminal poly(alkenyl aromatic) blocks and an internal poly(olefin) block.

In one embodiment, the block copolymer meets at least one of the following properties: a viscosity in toluene of greater than or equal to 5000 centipoise at 25° C. or a weight average molecular weight of 50,000 to 200,000.

In one embodiment, the block copolymer exhibits a solution viscosity equal to or greater than 5000 centipoise, measured at 25% in toluene at 25° C., or alternatively, a solution viscosity of 40 to 500, specifically about 50 to 450 measured at 25% in toluene at 25° C. The solution viscosity is related to the weight average molecular weight, with the block copolymer of Example 1 having a weight average MW of 70,000 and the block copolymer of Example 2 having a weight average MW of 104,000. The block copolymer can also have a weight average molecular weight of 50,000 to 200,000, specifically 85,000 to 125,000.

In another embodiment, the curable composition comprises a block copolymer that comprises a poly(acrylic) block derived from methacrylic $C_1$-$C_6$ ester monomers and a poly(styrene) block derived from styrene monomer, each of said poly(acrylic) block and poly(styrene) blocks located at a terminal end of the block copolymer. For example, the block copolymer can comprise a poly(styrene)-block-poly(1,4-butadiene)-block-poly(methyl methacrylate) copolymer.

Block copolymers for use in the curable composition are commercially available from various sources, for example, Kraton Polymers L.L.C. (Houston, Tex.) under the family trademark KRATON, specifically KRATON G block copolymers. The KRATON G series of block copolymers are styrenic block copolymers with a hydrogenated mid-block such as styrene-ethylene/butylene-styrene (SEBS) or styrene-ethylene/propylene-styrene (SEPS). Illustrative species are KRATON G164, G1650, G 1652, G1654, and G1641. Another embodiment of block copolymers for use in the curable composition are block copolymers commercially available from Arkema, Inc. (Philadelphia, Pa. or France) under the family trademark NANOSTRENGTH, in which relatively polar poly(methyl methacrylate) PMMA blocks are included with a styrene block and a butadiene block in the copolymers. NANOSTRENGTH copolymers consist of a polystyrene-block-poly(1,4-butadiene)-block-poly(methyl methacrylate), referred to as an SBM block copolymer. Illustrative species include the block copolymers available from Arkema and sold as NANOSTRENGTH E20, A012, A123, and A250. Such SBM block copolymers are also commercially available from Arkema under the family trademark CLEARSTRENGTH. Other block copolymers of styrene-polyolefin-methyl methacrylate are available from Atofina, including AF-X223, AF-X333, AF-X012, AF-X342, AF-X004, and AF-X250. Other block copolymers include low molecular weight block copolymers of styrene and maleic anhydride. They can comprise varying styrene to maleic anhydride mole ratios, for example, 1:1 to 4:1 and include partial monoesters. Such block copolymers are commercially available as SMA3840® from Sartomer Company (Exton, Pa.). Such block copolymers are known to the skilled artisan and can be in solid form.

In one embodiment, the curable composition for electrically insulating a motor comprises, either alone or in a blend with an unsaturated polyester and/or vinylester resin, a monofunctionalized or bifunctionalized poly(phenylene ether) having, respectively, one or two acryloyl or methacryloyl end groups and having an intrinsic viscosity in the range of about 0.06 deciliter per gram to about 0.25 deciliter per gram, measured in chloroform at 25° C., further in combination with a block copolymer as described herein and a reactive liquid monomer selected from the group consisting of vinyl toluene, styrene, alkyl styrenes, and combinations thereof, wherein the alkyl is a $C_1$-$C_4$ alkyl and can, optionally, be substituted with one or more halogens.

In the case of polymer blends such as PPE (poly(phenylene ether)) and UPR (unsaturated polyester resin) and/or VER (vinyl ester resin), it has been found that, although individually soluble in vinyl toluene and other reactive liquid monomers, a mixture of the two polymers in reactive liquid monomer can result in the formation of immiscible layers or phases. Phase separation can be particularly fast when using close to a 50:50 mixture by weight of the main polymers, PPE and UPR or VER. Although phase separation can occur at various ratios, it is especially fast when approaching a 50:50 weight polymer mixture as compared, for example, to a 95:5 or 5:95 weight polymer mixture of the main polymers.

The varnish compositions, therefore, can also contain a compatibilizing agent employed to stabilize the polymer mixture before coating. Coincidentally, it has been found that, in one embodiment, some of the block copolymers described above can also function as a compatibilizing agent, specifically block copolymers comprising acrylic and styrenic blocks, for example an acrylic block derived from acrylic or methacrylic ester monomers and a styrenic block derived from styrene monomer, as disclosed in U.S. Ser. No. 12/241,285, co-assigned and concurrently filed herewith. For example, the combination of a terminal methacrylate block and a terminal styrene block has been found to be particularly effective for compatibilizing purposes. An additional block can be present, for example, derived from monomers of a conjugated diene such as butadiene. However, additional blocks are optional for use as a compatibilizing agent. Use of such a compatibilizing agent allows a stable blend of PPE and UPR for at least about 24 hours, specifically up to three months or more at a temperature of 20° C. or 45° C. By phase stable is meant that no visible macro segregation into two separate phases occurs. Such compatibilizing agents are not necessary, of course, when the curable composition contains only one of a functionalized poly(phenylene ether), an unsaturated polyester, and a vinylester resin, rather than a blend comprising a functionalized poly(phenylene ether) and an unsaturated polyester and/or a vinylester resin.

Depending on the composition of the block copolymer used for preventing cracking, the same block copolymer may or may not be used for compatibilization in the case of the blends of curable polymers. In general, compatibilizing agents can include block copolymers comprising one block that is derived from an aromatic monomer, specifically a styrenic monomer which would be miscible with the PPE, and another block or chain that would be miscible with the UPE or VER, for example, derived from an acrylate, methacrylate, vinyl acetate, maleic anhydride monomers, or the like, or derived from monomers forming a polyester block such as poly(ethylene terephthalate), poly(butylene terephthalate), poly(tetramethylene terephthalate), and the like. In this case, the block copolymer is used to prevent phase separation between two polymers that are otherwise immiscible.

In an exemplary embodiment, compatibilizing agents, for blends of curable polymers, that are also useful block copolymers as described above are commercially available from Arkema Inc. (Philadelphia) under the family trademark NANOSTRENGTH, as described above with respect to the block copolymer, for example, NANOSTRENGTH E20 block copolymer.

In one embodiment, the present varnish composition comprises reactive liquid monomer in an amount of about 20 to about 70 weight percent of the curable composition and, within this range, specifically greater than or equal to 25 weight percent, more specifically greater than or equal to 30 weight percent, still more specifically greater than or equal to 35 weight percent, and still more specifically greater than or equal to 40 weight percent and, within this range, specifically less than or equal to 65 weight percent, more specifically less than or equal to 60 weight percent, and still more specifically less than or equal to 55 weight percent, and still more specifically less than or equal to 40 weight percent; curable polymer (functionalized poly(phenylene ether), unsaturated polyester and/or vinylester resin) in a total amount of about 10 to 45 weight percent of the composition and, within this range, specifically greater than or equal to 15 weight percent, more specifically greater than or equal to 20 weight percent, and still more specifically greater than or equal to 25 weight percent and, within this range, specifically less than or equal to 40 weight percent, more specifically less than or equal to 35 weight percent, and still more specifically less than or equal to 30 weight percent; and block copolymer (total amount of all block copolymer) in an amount of greater than 1 to greater than or equal to 15 weight percent (wt. %) of the composition and, within this range, specifically greater than or equal to 2 weight percent, more specifically greater than or equal to 3 weight percent, and still more specifically greater than or equal to 4 weight percent and, within this range, specifically less than or equal to 15 weight percent, more specifically less than or equal to 10 weight percent, and still more specifically less than or equal to 7 weight percent, wherein these weight percents are based on the total weight of the composition.

Accordingly, the varnish composition can be "solventless" varnish in one embodiment. By solventless is meant that, when combined, the varnish composition can be cured such that the polymers and the reactive liquid monomer can react to form an electrically insulative thermoset. Solventless also means that the composition excludes solvents that are incapable of being copolymerized with the functionalized PPE, UPR, VER, or blends thereof as described above.

In one embodiment, the curable composition comprises a functionalized poly(phenylene ether) (PPE) comprising at least one aliphatic carbon-carbon double bond or carbon-carbon triple bond. Functionalized poly(phenylene ether)s include capped poly(phenylene ether)s and ring-functionalized poly(phenylene ether)s. The functionalized poly(phenylene ether can be a functionalized homopolymer or copolymer in the present varnish compositions. The functionalized PPE can also be derived from PPE that contains moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly(phenylene ether) chains to produce a higher molecular weight polymer, provided a substantial proportion of free OH groups remains. In one exemplary embodiment, the PPE that is functionalized is a homopolymer.

When the functionalized poly(phenylene ether) is a capped poly(phenylene ether), at least one terminal hydroxyl group is terminated or "capped" with an end group containing aliphatic unsaturation to create functionalized PPE. The capped PPE may be either monofunctionalized or polyfunctionalized, for example, bifunctionalized, i.e. the capping can be at only one end or at both ends of the PPE chain or at a plurality of ends in a branched PPE. As mentioned above, the end caps can be any aliphatic unsaturated functional group, for example, acryloyl or methacryloyl groups.

In one embodiment, the capped poly(phenylene ether) is produced by capping a poly(phenylene ether) that is the polymerization product of at least one monohydric phenol having the structure:

(I)

wherein each $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. Suitable monohydric phenols include those described in U.S. Pat. No. 3,306,875 to Hay, and highly preferred monohydric phenols include 2,6-dimethylphenol and 2,3,6-trimethylphenol. The poly(phenylene ether) may be a copolymer of at least two monohydric phenols, such as 2,6-dimethylphenol and 2,3,6-trimethylphenol. More particularly, all of the above $C_1$-$C_{12}$ groups can be $C_1$-$C_7$ groups. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

In one embodiment, a capped poly(phenylene ether) comprises at least one capping group having the structure:

(II)

wherein $R^2$, $R^3$, and $R^4$ are each independently hydrogen, $C_1$-$C_{18}$ hydrocarbyl, $C_2$-$C_{18}$ hydrocarbyloxycarbonyl, nitrile, formyl, carboxylate, imidate, thiocarboxylate, or the like. In some embodiments, the capped poly(phenylene ether) comprises at least one acrylate ($R^2$=$R^3$=$R^4$=hydrogen) or methacrylate ($R^2$=methyl, $R^3$=$R^4$=hydrogen) capping group. It will be understood that the prefix "(meth)acryl-" includes both "acryl-" and "methacryl-". In one embodiment, the $C_1$-$C_{18}$ hydrocarbyl and $C_2$-$C_{18}$ hydrocarbyloxycarbonyl can have up to seven carbons.

In some embodiments, the capped poly(phenylene ether) comprises the residuum of a monohydric phenol, in which the capped poly(phenylene ether) may be a monocapped poly(phenylene ether) having the structure wherein each occurrence of $Q^1$, $Q^2$, $Q^1$ and $Q^4$ is as defined above; p is 1 to about 100, specifically 2 to about 30, more specifically 3 to about 20; $R^1$ is $C_1$-$C_{12}$ hydrocarbylene; n is 0 or 1; and $R^2$, $R^3$, and $R^4$ are each independently hydrogen or $C_1$-$C_{18}$ hydrocarbyl, wherein p can be a number such that the intrinsic viscosity of the PPE is about 0.06 deciliter per gram to about 0.25 deciliter per gram and can be about 0.09 deciliter per gram to about 0.15 deciliter per gram as measured in chloroform at 25° C.

In some embodiments, the capped poly(phenylene ether) is a monocapped poly(phenylene ether) having the structure:

wherein $Q^5$ and $Q^6$ are each independently methyl or di-n-butylaminomethyl; s is 1 to about 20, specifically 1 to about 15, more specifically 1 to about 10, still more specifically 1 to about 8.

In some embodiments, the capped poly(phenylene ether) comprises a reaction product of a monohydric, dihydric phenol, or monohydric and dihydric phenol, in which the capped poly(phenylene ether) can be a bicapped poly(phenylene ether) having the structure:

wherein each occurrence of $Q^1$, $Q^2$, $Q^3$ and $Q^4$ is as defined above; each occurrence of x and y is independently 0 to about 100 with the proviso that the sum of x and y is 2 to about 100; each occurrence of $R^1$ is independently $C_1$-$C_{12}$ hydrocarbylene; each occurrence of n is independently 0 or 1; each occurrence of $R^2$-$R^4$ is independently hydrogen or $C_1$-$C_{18}$ hydrocarbyl; and L has the structure:

wherein each occurrence of $Q^3$ is independently hydrogen, halogen, unsubstituted or substituted $C_1$-$C_{12}$ hydrocarbyl (with the proviso that the hydrocarbyl group is not tertiary hydrocarbyl), $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has a structure selected from the group consisting of wherein each occurrence of $R^5$ is independently selected from the group consisting of hydrogen and $C_1$-$C_{12}$ hydrocarbyl and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ can optionally collectively form a $C_4$-$C_{12}$ alkylene group.

The functionalized PPE for use in accordance with exemplary embodiments of the invention may be made by any suitable method of making capped PPE, including but not limited to the methods described in U.S. Pat. No. 6,897,282 and U.S. Pat. No. 7,329,708, which are hereby incorporated by reference in their entirety. For example, this process can begin with oxidative coupling of at least one monohydroxyaromatic compound such as 2,6-xylenol or 2,3,6-trimethylphenol by methods known in the art.

Catalyst systems are generally employed for such coupling and they typically contain at least one heavy metal compound such as a copper, manganese, or cobalt compound, usually in combination with various other materials. The polymerization is performed in a suitable solvent such as benzene or toluene by way of example only, for example, at a temperature about 20° C. to about 100° C. Thereafter, the catalyst is removed.

After removal of the catalyst, the PPE containing solution is concentrated to a higher solids level as part of the isolation of the PPE by removing the polymerization solvent. A suitable functionalizing agent, depending on the desired end group for the PPE, is added prior to and/or during the solvent removal, resulting in the capped PPE. For example, to make PPE having (meth)acryloyl end groups according to one embodiment of the invention, a suitable functionalizing agent is methacrylic anhydride. PPE is typically a solid at room temperature. It can be partially soluble in the reactive liquid monomer at room temperature.

In some embodiments, the functionalized poly(phenylene ether) is a bicapped poly(phenylene ether) having the structure:

wherein each occurrence of $Q^5$ and $Q^6$ is independently methyl or di-n-butylaminomethyl; each occurrence of x and y is independently 0 to about 100 with the proviso that the sum of x and y is 2 to about 100.

In some embodiments, the functionalized poly(phenylene ether) is a capped poly(phenylene ether) having the structure:

(VIII)

wherein U is a $C_6$-$C_{18}$ aryl group optionally substituted with one or more $C_1$-$C_6$ alkyl groups; V is a phenylene ether group; k is 1 to about 100; r is 1 to 6; W is a phenylene group or an oxygen atom; each occurrence of $R^8$, $R^9$, and $R^{10}$ is independently selected from the group consisting of hydrogen, $C_1$-$C_6$ alkyl, $C_2$-$C_6$ alkenyl, and $C_2$-$C_6$ alkynyl; and q is 1, 2, 3, or 4. Procedures for synthesizing capped poly(phenylene ether)s having this structure are described in U.S. Patent Application Publication No. US 2004/0146692 A1 of Inoue et al.

In another embodiment, the functionalized poly(phenylene ether) comprises a ring-functionalized poly(phenylene ether) comprising repeating structural units of the formula wherein each $L^1$-$L^4$ is independently hydrogen, a $C_1$-$C_{12}$ allyl group, an alkenyl group, or an alkynyl group; wherein the alkenyl group is represented by wherein $L^5$-$L^7$ are independently hydrogen or methyl, and a is 0, 1, 2, 3, or 4; wherein the alkynyl group is represented by (VII)

wherein $L^5$ is hydrogen, methyl, or ethyl, and b is 0, 1, 2, 3, or 4; and wherein about 0.02 mole percent to about 25 mole percent of the total $L^1$-$L^4$ substituents in the ring-functionalized poly(phenylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups. The ring-functionalized poly(phenylene ether) of this embodiment may be prepared according to known methods. For example, an unfunctionalized poly(phenylene ether) such as poly(2,6-dimethyl-1,4-phenylene ether) may be metallized with a reagent such as n-butyl lithium and subsequently reacted with an alkenyl halide such as allyl bromide and/or an alkynyl halide such as propargyl bromide. This and other methods for preparation of ring-functionalized poly(phenylene ether) resins are described, for example, in U.S. Pat. No. 4,923,932 to Katayose et al.

In some embodiments, the ring-functionalized poly(phenylene ether) is the product of the melt reaction of a poly(phenylene ether) and an α,β-unsaturated carbonyl compound or a β-hydroxy carbonyl compound. Examples of α,β-unsaturated carbonyl compounds include, for example, maleic anhydride, citriconic anhydride, and the like. Examples of β-hydroxy carbonyl compounds include, for example, citric acid, and the like. Such functionalization is typically carried out by melt mixing the poly(phenylene ether) with the desired carbonyl compound at a temperature of about 190 to about 290° C.

For embodiments the curable composition comprising an unsaturated polyester, such resins are generally obtained by reaction of at least one polyhydric alcohol with at least one polybasic acid comprising an unsaturated polybasic acid. Specific examples of unsaturated polybasic acids that may be used to form the unsaturated polyester resin include maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and the like, as well as their corresponding esters and anhydrides. Specific unsaturated acids include maleic acid, fumaric acid, and their esters and anhydrides.

Often, polyfunctional saturated and aromatic acids are employed in conjunction with the polybasic unsaturated acids to reduce the density of the ethylenic unsaturation and provide the desired chemical and mechanical properties to the coating. Examples of saturated and aromatic polybasic acids include succinic acid, adipic acid, sebacic acid, azelaic acid, dodecanedioic acid, eicoic acid, phthalic acid, isophthalic acid, terephthalic acid, and the like, as well as their esters and anhydrides. Specific aromatic polybasic acids include phthalic acid, isophthalic acid, and their esters and anhydrides.

Examples of polyhydric alcohols include ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, hydrogenated bisphenol A, bisphenol A-alkylene oxide adducts, tetrabromobisphenol A-alkylene oxide adducts, and the like. An exemplary polyhydric alcohol is propylene glycol.

In one embodiment, the unsaturated polyester is the reaction product of at least one polyhydric alcohol comprising propylene glycol; at least one unsaturated polybasic acid comprising maleic acid or maleic anhydride; and at least one aromatic polybasic acid comprising phthalic acid, phthalic anhydride, or isophthalic acid. Unsaturated polyester resins are commercially available, often as compositions further comprising an alkenyl aromatic monomer, and include, for example, the unsaturated polyester resins obtained from Ashland Chemical as Ashland Q6585 and MR14072, and from Alpha Owens Corning as AOC-XV2346. The unsaturated polyester resin obtained from Ashland as Q6585 is described by its manufacturer as "high-reactivity, thickenable, polyester resin for use in low profile and controlled shrink applications." The datasheet supplied with the material indicates a styrene content of 35 weight percent. Another unsaturated polyester resin is commercially available as 707C from Von Roll (Schenectady, N.Y. The latter unsaturated polyester resin in vinyl toluene (without PPE) has been used for varnishes.

In addition to or as an alternative to an unsaturated polyester, the curable varnish composition can comprise a vinyl ester resin. Whereas an unsaturated polyester resin has vinyl bonds randomly placed in the main chain, a vinyl ester resin has vinyl bonds at both chain ends. In one embodiment, the vinyl ester resin is a product commercially available from Dow (Michigan) as DERAKANE® M311-450. In one embodiment, the vinyl ester resin is a linear reaction product of bisphenol A and an epichlorohydrin epoxy that is terminated with an unsaturated acid such as methacrylic acid.

Another primary part of the varnish composition is a reactive liquid monomer in which the polymers in the composition are dissolved prior to application of the varnish. By "reactive liquid monomer" is meant any reactive monomer that is in liquid form and is curable with the main polymers (PPE and UPR) to form a thermoset. Exemplary solvents include vinyl toluene, styrene, t-butyl styrene, dibromostyrene, and combinations of those. Any suitable ratio of total curable polymers to reactive liquid monomer may be used, although the ratio is typically between about 2:1 to about 1:5 by weight of curable-polymer: solvent, and may be about 1:1 by weight of curable-polymer:solvent. However, these ratios may be further varied, for example, if any additives or crosslinking agents are added which may further enhance varnish performance.

Varnish compositions according to exemplary embodiments have been discovered to form thermosets that have superior properties over those of prior-art varnishes, including a significantly higher glass transition temperature ($T_g$), which generally is at least about 70° C. and may range up to about 170° C. or higher. More typically, the $T_g$ is about 100° C. to about 165° C. As a result, the varnishes exhibit greater thermal stability over prior-art varnishes, such as varnishes containing unsaturated polyester resin alone as a main polymer.

There is no particular limitation on the method by which the composition is prepared. For example, the composition can be prepared by forming an intimate blend of the curable polymer or polymers (whether functionalized poly(phenylene ether) or unsaturated polyester or vinylester resin, or blends of two or three of the foregoing polymers), the alkenyl aromatic monomer, and the block copolymer. In the case of blends, a compatibilizing agent may also be included or the block copolymer can be selected to also provide compatibilization as well as the desired non-cracking performance. When a functionalized poly(phenylene ether) that is a capped poly(phenylene ether) is present, the composition can be prepared directly from an uncapped poly(phenylene ether) by dissolving the uncapped poly(phenylene ether) in a portion of the alkenyl aromatic monomer, adding a capping agent to form the capped poly(phenylene ether) in the presence of the alkenyl aromatic monomer, and optionally adding the unsaturated polyester resin or vinyl ester resin, and any other components or additives to form the curable composition. Alternatively, in the case of blends with poly(phenylene ether) (PPE), the unsaturated polyester resin (UPR) and/or vinyl ester resin (VER) can be obtained in a varnish composition already containing reactive liquid monomer, in which case PPE and additional reactive liquid monomer plus crosslinking agent can be separately prepared in a pre-mixture and then mixed with the UPR and/or VER varnish composition. The block copolymer and optionally a separate compatibilizing agent can, for example, be dissolved in additional reactive liquid monomer and then mixed in with the combined PPE and UPR and/or VER, or can be added to the pre-mixture of PPE after the PPE is dissolved.

The varnish composition is generally applied to a generator or motor winding, such as a traction motor winding for a locomotive or off-highway vehicle, and cured. In an exemplary embodiment, the curing process results in a chemical reaction in which the monomer diluent chemically reacts with the PPE and UPR and together forms a thermoset varnish coating that protects the entire motor winding assembly. The curing may be self-initiating or may require initiation of the reaction between the curable polymer or blended polymers, and the reactive liquid monomer through the use of a curing initiator, such as a catalyst.

The curing initiator can include any compound capable of producing free radicals at elevated temperatures. Such curing initiators may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures thereof. Suitable non-peroxy initiators include, for example, 2,3-dimethyl-2,3-diphenylbutane, 2,3-trimethylsilyloxy-2,3-diphenylbutane, and the like, and mixtures thereof. The curing initiator may further include any compound capable of initiating anionic polymerization of the unsaturated components. Such anionic polymerization initiators include, for example, alkali metal amides such as sodium amide ($NaNH_2$) and lithium diethyl amide ($LiN(C_2H_5)_2$), alkali metal and ammonium salts of $C_1$-$C_{10}$ alkoxides, alkali metal hydroxides, ammonium hydroxides, alkali metal cyanides, organometallic compounds such as the alkyl lithium compound n-butyl lithium, Grignard reagents such as phenyl magnesium bromide, and the like, and combinations thereof. In one embodiment, the curing initiator is a peroxide, such as 2,5-bis-(t-butyl peroxy)-2,5-dimethyl-3-hexane or dicumyl peroxide or combinations thereof. The curing initiator may promote curing at a temperature in a range of about 0° C. to about 200° C. When employed, the curing initiator is typically used in an amount of about 0.005 to about 2 parts by weight per 100 parts by weight total of curable polymer (PPE, UPR, and/or VER), and reactive liquid monomer.

There is no particular limitation on the method by which the composition may be cured. The composition may, for example, be cured thermally or by using irradiation techniques, including radio frequency heating, UV irradiation, and electron beam irradiation. For example, the composition may be cured by initiating chain-reaction curing with 10 seconds of radio frequency heating. When heat curing is used, the temperature selected may be about 80° to about 300° C., and the heating period may be about 5 seconds to about 24 hours. For example, if the curing initiator is dicumyl peroxide, the varnish may be cured for a time in the range of about 1 minute to about 10 hours at temperatures in the range of about 120° C. to about 200° C.

Curing may be conducted in multiple steps using different times and temperatures for each step. For example, curing may be staged to produce a partially cured and often tack-free resin, which then is fully cured by heating for longer periods or at higher temperatures. One skilled in the thermoset arts is capable of determining suitable curing conditions without undue experimentation. In some embodiments, the composition may be partially cured. However, references herein to properties of the "cured composition" or the "composition after curing" generally refer to compositions that are substantially fully cured. One skilled in the thermoplastic arts may determine whether a sample is substantially fully cured without undue experimentation. For example, one may analyze the sample by differential scanning calorimetry to look for an exotherm indicative of additional curing occurring during the analysis. A sample that is substantially fully cured will exhibit little or no exotherm in such an analysis.

The varnish composition can be applied and cured according to any suitable technique. One example of such a method is the vacuum pressure impregnation method, in which a entire motor winding assembly is placed in a pressure vessel under a high vacuum that draws out entrapped air and other gases. The varnish is introduced to the pressure vessel and the entire tank is pressurized, typically to at least 0.62 megaPascal (90 pounds per square inch) or higher to achieve a total penetration of the winding. The assembly may be baked at elevated temperatures to cure the varnish composition, i.e. to cause the main polymers, the reactive liquid monomer, and any additives to form a thermoset, producing a solid, sealed insulation system substantially impervious to moisture. Other suitable coating and curing techniques include dip coat and trickle treat, by way of example only.

Although compositions according to exemplary embodiments of the invention provide excellent properties, particularly when compared to current unsaturated polyester resin varnishes, it may still be desirable to introduce additives to the varnish composition prior to curing to even further enhance various properties. For example, a crosslinking agent may be added to even further enhance ductility and thermal stability, particularly in embodiments in which a PPE is present that is monofunctionalized or in which a PPE is present that has a relatively low intrinsic viscosity. A crosslinking agent is defined as a compound comprising at least two polymerizable groups selected from carbon-carbon double bonds, carbon-carbon triple bonds, and combinations thereof. Specifically, in the case of capped poly(phenylene ether), the crosslinking agent has functional groups that are same as the PPE end caps. For example, where the end caps are methacrylate groups, particularly suitable crosslinking agents include methacrylate-grafted polybutadiene, trimethylolpropane triacrylate (TMPTA), ethoxylated bisphenol A di(meth)acrylate, and combinations thereof.

Other suitable crosslinking agents include, for example, divinylbenzenes, diallylbenzenes, trivinylbenzenes, triallylbenzenes, divinyl phthalates, diallyl phthalates, triallyl mesate, triallyl mesitate, triallyl cyanurate, triallyl isocyanurate, trimethylolpropane tri(meth)acrylate, 1,6-hexanediol di(meth)acrylate, neopentyl glycol di(meth)acrylate, dipropylene glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, (ethoxylated)$_{2-40}$ 1,6-hexanediol di(meth)acrylates, (propoxylated)$_{2-40}$ 1,6-hexanediol di(meth)acrylates, (ethoxylated)$_{2-40}$ 1,4-butanediol di(meth)acrylates, (propoxylated)$_{24-0}$ 1,4-butanediol di(meth)acrylates, (ethoxylated)$_{2-40}$ 1,3-butanediol di(meth)acrylates, (propoxylated)$_{2-40}$ 1,3-butanediol di(meth)acrylates, (ethoxylated)$_{2-40}$ ethylene glycol di(meth)acrylates, (propoxylated)$_{2-40}$ ethylene glycol di(meth)acrylates, (ethoxylated)$_{2-40}$ propylene glycol di(meth)acrylates, (propoxylated)$_{24-0}$ propylene glycol di(meth)acrylates, (ethoxylated)$_{2-40}$ 1,4-cyclohexanedimethanol di(meth)acrylates, (propoxylated)$_{2-40}$ 1,4-cyclohexanedimethanol di(meth)acrylates, (ethoxylated)$_{2-40}$ bisphenol-A di(meth)acrylates, (propoxylated)$_{2-40}$ bisphenol-A di(meth)acrylates, (ethoxylated)$_{3-60}$ glycerol tri(meth)acrylates, (propoxylated)$_{3-60}$ glycerol tri(meth)acrylates, (ethoxylated)$_{3-60}$ trimethylolpropane tri(meth)acrylates, (propoxylated)$_{3-60}$ trimethylolpropane tri(meth)acrylates, (ethoxylated)$_{3-60}$ isocyanurate tri(meth)acrylates, (propoxylated)$_{3-60}$ isocyanurate tri(meth)acrylates, (ethoxylated)$_{4-80}$ pentaerythritol tetra(meth)acrylates, (propoxylated)$_{4-80}$ pentaerythritol tetra(meth)acrylates, (ethoxylated)$_{6-120}$ dipentaerythritol tetra(meth)acrylates, (propoxylated)$_{6-120}$ dipentaerytlritol tetra(meth)acrylates, and the like, and mixtures thereof.

When present, the crosslinking agent may be used in an amount of about 1 to about 30 parts by weight, based on 100 parts by weight in total of the curable polymer (PPE, UPR, and/or VER), and reactive liquid monomer. Within this range, the crosslinker can be present in an amount specifically up to 25 parts by weight, more specifically up to 20 parts by weight and, within this range, specifically greater than or equal to 5 parts by weight, more specifically greater than or equal to 10 parts by weight, and still more specifically greater than or equal to 15 parts by weight.

Additives may include curing inhibitors and/or stabilizers that may increase shelf life of the varnish compositions. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$-$C_6$-alkyl-substituted catechols (such as 4 tert-butylcatechol), dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations thereof. Suitable curing inhibitors further include poly(phenylene ether)s having free hydroxyl groups. When present, the curing inhibitor amount may be about 0.001 to about 10 parts by weight per 100 parts by weight of the total composition. If added, the curing inhibitors may be in combination with or in lieu of curing initiators.

The composition may, optionally, further comprise one or more additives such as, for example, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, and combinations thereof. It is desirable that certain thermoplastics commonly referred to as "low profile additives" (LPAs) are absent from the composition. During curing, an LPA is rejected from the cured matrix and isolated as solid domains, typically less than about 5 micrometers in size, which distinct LPA domains dispersed in the cured matrix act as strain relief sites. Accordingly, the absence of LPAs in the composition can prevent weak points for dielectric breakthrough.

As indicated above, the varnish composition is particularly useful as an electrically insulative coating for motors and generators, such as traction motors for locomotives and off-highway vehicles (OHV). This is because varnish compositions according to exemplary embodiments can exhibit improved resistance to thermal cycling. The composition is also more ductile, exhibiting a higher elongation to break than prior-art varnish compositions.

While current varnish compositions generally have relatively low ductility, with an elongation to break of about 1% or less, exemplary embodiments of the invention generally can have high ductility and may have an elongation to break greater than about 2%, and may be greater than about 2.5%, and may even be greater than about 3%. This is especially the case with compositions comprising a functionalized poly(phenylene ether)

Resistance to thermal cycling may conveniently be measured by a nut cracking test, as described further in the Examples below. The test protocols are designed to evaluate whether a varnish can meet typical rail life requirements for a varnish composition. In particular, the hex nut cracking test is designed to evaluate the stresses induced on the traction motor while going from, for example, deserts in Arizona to mountains in Colorado. The conditions of the nut cracking test are designed to accelerate crack initiation in the varnish composition being tested. Accordingly, a half inch (1.3 centimeter) hex nut is placed in the center of an aluminum pan having a diameter of 2 inches (5.1 centimeters). A sample is made by pouring 12 grams of varnish composition onto the nut in the aluminum pan and then degassing under vacuum for approximately 15 minutes. The sample is then cured. After curing and initial inspection, the sample is refrigerated for a specified period of time, the sample is removed, inspected for cracking, and placed immediately into an oven for a specified time. It is then removed, inspected, and immediately returned to the refrigeration. This cycle is repeated a specified period of times at specified temperatures. If the sample passes the thermal cycles without cracking, it generally indicates that the composition has sufficient ductility and resistance to thermal cycling for varnish applications. Compositions that crack during the cycles fail the test and are generally not suitable for varnish applications.

Exemplary embodiments of the composition, when cured, can exhibit improved thermal stability above 180° C., including significant improvement in less weight loss after aging for 100 hours at 215° C.

Other advantageous properties include hydrolytic stability and less cracking or chipping. Improved mechanical or electrical properties can also be obtained, namely low dielectric constant and dissipation factor, dimensional stability, and chemical resistance, especially to acid or base. The resulting balance of properties is an improvement compared to the use of unsaturated polyester resin alone. Consequently, the present varnish can significantly extend the life of traction motors and the like.

The invention includes at least the following embodiments:

EMBODIMENT 1

A curable composition comprising a functionalized poly(phenylene ether), an unsaturated polyester, and/or a vinylester resin; a reactive liquid monomer, and a block copolymer comprising a poly(olefin) block comprising repeat units derived from a $C_2$-$C_4$ olefinic monomer or a poly(diolefin) block comprising repeat units derived from a $C_4$-$C_6$ diolefinic monomer and at least one terminal poly(alkenyl aromatic) block comprising repeat units derived from an alkenyl aromatic monomer.

EMBODIMENT 2

The method of embodiment 1 wherein the poly(alkenyl aromatic) block is greater than or equal to 10 wt. % by weight of the block copolymer.

EMBODIMENT 3

The method of embodiment 1 or 2 wherein the block copolymer is a triblock copolymer having three blocks of at least two different monomeric compositions.

EMBODIMENT 4

The method of any of embodiments 1 to 3 wherein the block copolymer is a linear triblock copolymer comprising two terminal poly(alkenyl aromatic) blocks and an internal poly(olefin) block.

EMBODIMENT 5

The method of any of embodiments 1 to 4 wherein the curable composition comprises a functionalized poly(phenylene ether) comprising at least one aliphatic unsaturated group and exhibiting an intrinsic viscosity of about 0.06 to about 0.25 deciliter per gram, measured in chloroform at 25° C., and wherein the block copolymer meets at least one of the following requirements: a viscosity at 25 wt. % in toluene of greater than or equal to 5000 centipoise at 25° C. or weight average molecular weight of 50,000 to 200,000.

EMBODIMENT 6

The method of any of embodiments 1 to 5 wherein the block copolymer comprises a poly(olefin) block comprising repeat units derived from ethylene, isoprene, or butene or comprises a poly(diolefin) block comprising repeat units of butadiene.

EMBODIMENT 7

The method of any of embodiments 1 to 6, wherein the block copolymer is used in an amount of greater than 1 weight percent to 10 weight percent, based on the total weight of functionalized poly(phenylene ether), unsaturated polyester resin and/or vinylester resin, and wherein composition is crack free, based on specified hex nut cracking testing.

EMBODIMENT 8

The method of any of embodiments 1 to 7 wherein the block copolymer comprises a poly(acrylic) block derived from methacrylic $C_1$-$C_6$ ester monomers and a poly(styrene) block derived from styrene monomer, each of said poly(acrylic) block and poly(styrene) blocks located at a terminal end of the block copolymer.

EMBODIMENT 9

The method of embodiment 8 wherein the block copolymer comprises a poly(styrene)-block-poly(1,4-butadiene)-block-poly(methyl methacrylate) copolymer.

EMBODIMENT 10

The method of any of embodiments 1 to 9 wherein the functionalized poly(phenylene ether) is present and is terminally capped with a group containing aliphatic unsaturation.

EMBODIMENT 11

The method of any of embodiments 1 to 10 wherein the unsaturated polyester resin is present and is obtained by reaction of at least one polyhydric alcohol with at least one polybasic acid comprising an unsaturated polybasic acid, wherein the unsaturated polybasic acid is selected from the group consisting of maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and their corresponding esters and anhydrides.

EMBODIMENT 12

The method of any one of embodiments 1 to 11 wherein the vinylester resin is present and based on the reaction product of a bisphenol, an epoxy, and a monocarboxylic acid.

EMBODIMENT 13

The method of any one of embodiments 1 to 12 wherein the reactive liquid monomer is selected from the group consisting of vinyl toluene, styrene, t-butyl styrenes, dibromostyrenes, and combinations thereof.

EMBODIMENT 14

The method of any one of embodiments 1 to 13 wherein a mixture of both a functionalized poly(phenylene ether) and an unsaturated polyester or vinyl ester resin is present, and the ratio of the total amount of functionalized poly(phenylene ether) and unsaturated polyester resin or vinylester resin to the reactive liquid monomer is about 2:1 to about 1:5 by weight.

EMBODIMENT 15

A method for electrically insulating a motor using a varnish composition comprising applying a varnish composition according to any one of embodiments 1 to 14 to a motor component; and curing the varnish composition to form an electrically insulative thermoset coating over the motor component.

The following examples are presentation by way of illustration only and not by way of limitation.

EXAMPLES 1-5, COMPARATIVE EXAMPLE 1

A series of formulations were prepared, each by dissolving a 50 part portion of a methacrylated poly(phenylene ether) with an IV of 0.09, commercially available from SABIC Inovative Plastics, in 50 parts of vinyl toluene. Then 1.5 parts dicumyl peroxide as well as 0.5 parts of t-butyl catechol were then added to each along with 5 parts of the block copolymer in Table 1.

TABLE 1

| Example | Polymer Composition (50 parts) | Monomer Composition (50 parts) | Composition of block copolymer (order of blocks) (5 parts) | Trademark of block copolymer | Additives (1.5 parts & 0.5 parts, respectively) |
|---|---|---|---|---|---|
| C. Ex. 1 | Methacrylated poly(phenylene ether) | Toluene | None | None | Dicumyl peroxide & t-butyl catechol |
| Ex. 1 | Methacrylated poly(phenylene ether) | Toluene | 1) Styrene 2) ethylene/butylene 3) Styrene | KRATON G-1652 Block Copolymer | Dicumyl peroxide & t-butyl catechol |

TABLE 1-continued

| Example | Polymer Composition (50 parts) | Monomer Composition (50 parts) | Composition of block copolymer (order of blocks) (5 parts) | Trademark of block copolymer | Additives (1.5 parts & 0.5 parts, respectively) |
|---|---|---|---|---|---|
| Ex. 2 | Methacrylated poly(phenylene ether) | Toluene | 1) Styrene 2) ethylene/butylene 3) Styrene | KRATON G-1650 Block Copolymer | Dicumyl peroxide & t-butyl catechol |
| Ex. 3 | Methacrylated poly(phenylene ether) | Toluene | 1) Styrene 2) ethylene/butylene 3) Styrene | KRATON G-1641 Block Copolymer | Dicumyl peroxide & t-butyl catechol |
| Ex. 4 | Methacrylated poly(phenylene ether) | Toluene | 1) Styrene 2) ethylene/butylene 3) Styrene | KRATON G-1654 Block Copolymer | Dicumyl peroxide & t-butyl catechol |
| Ex. 5 | Methacrylated poly(phenylene ether) | Toluene | 1) 1,4-polybutadiene 2) Styrene 3) Methyl methacrylate | ARKEMA NANO-STRENGTH E20 Block Copolymer | Dicumyl peroxide & t-butyl catechol |

The samples were cured at 160° C. for 2 hours followed by 180° C. for 1 hour. Dynamic mechanical analysis (DMA) testing was performed on samples with the following dimensions: 2.5 inch×0.5 inch×0.125 inch (6.4 centimeter×1.3 centimeter×0.32 centimeter). Included in Table 2 below are the glass transition temperature ($T_g$) data (based on the tan δ max) as well as the plateau modulus (dynes/cm$^2$).

TABLE 2

| Example | $T_g$ (° C.) | Plateau Modulus (dynes/cm$^2$) | Solution Viscosity of Block Copolymer (25 wt. % in Toluene at 25° C., cP) | Solution Viscosity of Block Copolymer (10% in Toluene at 25° C.) |
|---|---|---|---|---|
| C. Ex. 1 | 138 | $2.6 \times 10^7$ | None | None |
| Ex. 1 | 168 | $3.0 \times 10^7$ | 1800 | 30 |
| Ex. 2 | 164 | $3.5 \times 10^7$ | 8000 | 50 |
| Ex. 3 | 138 | $2.0 \times 10^7$ | >50,000 | 80 |
| Ex. 4 | 134 | $2.2 \times 10^7$ | >50,000 | 410 |
| Ex. 5 | 146 | $2.7 \times 10^7$ | NA* | NA |

NA = not available

The results show that the effect of the block copolymer cannot be uniformly related to either Tg or plateau modulus, the latter being inversely related to the molecular mass between entanglements. In some cases the plateau modulus decreased upon the addition of the block copolymer and in some cases both the transition glass temperature $T_g$ and the plateau modulus increased. Based on the solution viscosities, however, superior results are shown, with respect to the block copolymer of Examples 1 to 4, for which the solution viscosity is equal to or greater than 5000 centipoise, measured at 25% in toluene at 25° C., or alternatively, a solution viscosity of 40 to 500, specifically about 50 to 450 measured at 25% in toluene at 25° C., provides superior results. The solution viscosity is related to the weight average molecular weight, with the block copolymer of Example 1 having a weight average MW of 70,000 and the block copolymer of Example 2 having a weight average MW of 104,000. The order of the Examples for Examples 1 to 4 is the order of increasing molecular weight and solution viscosity.

A hex nut cracking test for ductility was also run on these materials. This was conducted as follows: Half-inch (1.3 centimeter) hex nuts were placed in the center of 2 inch (5.1 centimeter) diameter aluminum pans. Approximately 12 gram portions of each resin were then poured into the pans and degassed under vacuum for 15 minutes. The materials were cured as described above. All of these formulations gave well cured, crack free samples. They were then subjected to seven thermal cycles from −46° C. to 220° C. In particular, the samples were placed in a refrigerator at a temperature of −46 to −50° C. for 24 hours and then immediately placed in a 220° C. oven for 24 hours. Both the refrigerator and oven were kept at the specified temperature. At the end of this time the samples were re-evaluated. The results are shown in Table 3.

TABLE 3

| Example | No. of Cracks in Cracking Test |
|---|---|
| Comp. Ex. 1 | 5 |
| Ex. 1 | 2 |
| Ex. 2 | 0 |
| Ex. 3 | 0 |
| Ex. 4 | 0 |
| Ex. 5 | 1 |

Figure 1A:
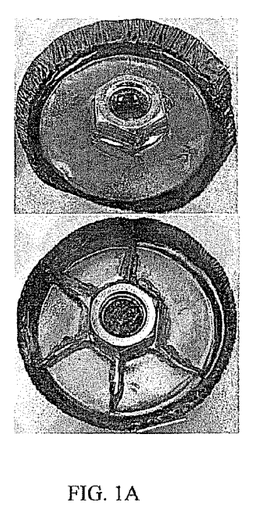
Figure 1B:
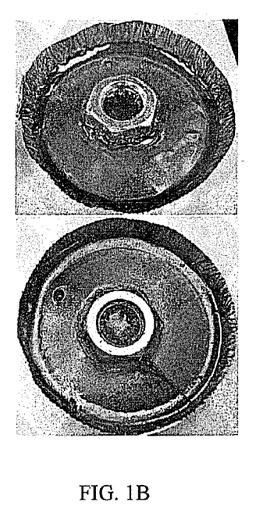
Figure 1C:
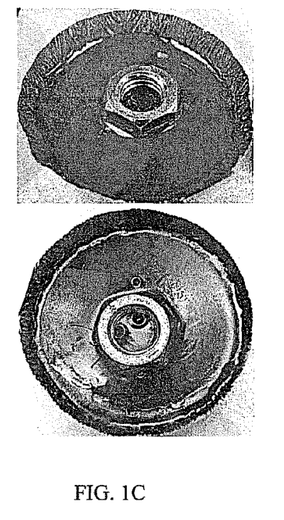
Figure 1D:
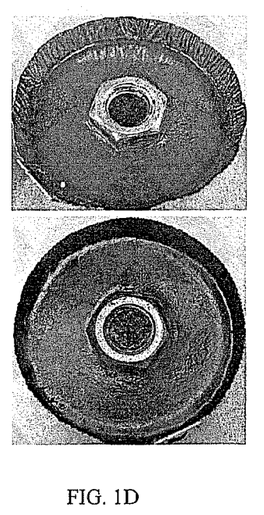
Figure 1E:
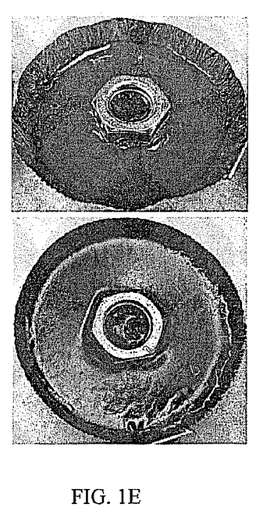
Figure 1F:
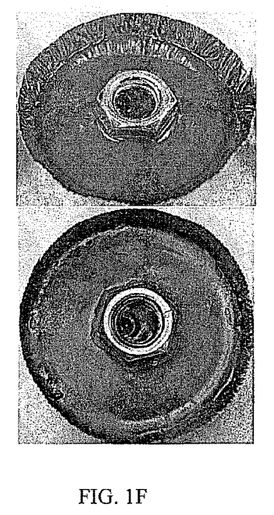

As presented in Table 3, the formulation of Comparative Example 1 was observed to have 5 large cracks. The formulation of Example 5 exhibited one large crack, while the formulation of Example 1 was observed to have two small cracks. The formulations of Examples 2, 3, and 4 were all crack free, indicating that they provided excellent ductility. The results are also depicted in FIG. 1, in which FIG. 1A corresponds to Comparative Example 1, and FIGS. 1B to 1F correspond to Examples 1 to 5, respectively. The upper image in each of FIGS. 1A to 1F corresponds to the cured formulation before aging (thermal cycling), and the lower image corresponds to the aged formulations.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A curable composition comprising:
 a functionalized poly(phenylene ether), an unsaturated polyester, and/or a vinylester resin;
 a reactive liquid monomer, and
 a block copolymer comprising a poly(olefin) block comprising repeat units derived from a $C_2$-$C_4$ olefinic monomer or a poly(diolefin) block comprising repeat units derived from a $C_4$-$C_6$ diolefinic monomer and at least one terminal poly(alkenyl aromatic) block comprising repeat units derived from an alkenyl aromatic monomer; wherein the block copolymer comprises a poly(acrylic) block derived from methacrylic $C_1$-$C_6$ ester monomers and wherein the terminal poly(alkenyl aromatic) block is a poly(styrene) block derived from styrene monomer, each of said poly(acrylic) block and poly(styrene) blocks located at a terminal end of the block copolymer.

2. The curable composition of claim 1 wherein the functionalized poly(phenylene ether) comprises at least one aliphatic unsaturated group and has an intrinsic viscosity of about 0.06 to about 0.25 deciliter per gram, measured in chloroform at 25° C., and wherein the block copolymer meets at least one of the following requirements: a viscosity at 25 wt. % in toluene of greater than or equal to 5000 centipoise at 25° C. or weight average molecular weight of 50,000 to 200,000.

3. The curable composition of claim 1, wherein the block copolymer is used in an amount of greater than 1 weight percent to 10 weight percent, based on the total weight of functionalized poly(phenylene ether), unsaturated polyester resin and/or vinylester resin, and wherein upon curing, said composition is crack free, based on specified hex nut cracking testing.

4. The curable composition of claim 1 wherein the block copolymer comprises a poly(styrene)-block-poly(1,4-butadiene)-block-poly(methyl methacrylate) copolymer.

5. The curable composition of claim 1, wherein the functionalized poly(phenylene ether) is present and is terminally capped with a group containing aliphatic unsaturation.

6. The curable composition of claim 5, wherein the functionalized poly(phenylene ether) is a bifunctionalized capped poly(phenylene ether) having methacryloyl end groups.

7. The curable composition of claim 5, wherein the functionalized poly(phenylene ether) is a capped poly(phenylene ether) having the structure:

substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of x and y is independently 0 to about 100 with the proviso that the sum of x and y is 2 to about 100; each occurrence of $R^1$ is independently $C_1$-$C_{12}$ hydrocarbylene; each occurrence of n is independently 0 or 1; each occurrence of $R^2$-$R^4$ is independently hydrogen or $C_1$-$C_{18}$ hydrocarbyl; and L has the structure:

wherein each occurrence of $Q^3$ is, as defined above, independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has a structure selected from the group consisting of -continued wherein each occurrence of $R^5$ is independently selected from the group consisting of hydrogen and $C_1$-$C_{12}$ hydrocarbyl and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene.

8. The curable composition of claim 7, wherein the functionalized poly(phenylene ether) is a capped poly(phenylene ether) having the structure wherein each occurrence of $Q^5$ and $Q^6$ is independently methyl or di-n-butylaminomethyl; and each occurrence of x and y is independently 0 to about 100 with the proviso that the sum of x and y is 2 to about 100.

9. The curable composition of claim 1, wherein the functionalized poly(phenylene ether) is present and is a capped poly(phenylene ether) having the structure:

wherein each occurrence of $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; p is 1 to about 100; $R^1$ is $C_1$-$C_{12}$ hydrocarbylene; n is 0 or 1; and $R^2$ and $R^3$ and $R^4$ are each independently hydrogen or $C_1$-$C_{18}$ hydrocarbyl.

10. The curable composition of claim 9, wherein the functionalized poly(phenylene ether) is a capped poly(phenylene ether) having the structure:

wherein $Q^5$ and $Q^6$ are each independently methyl or di-n-butylaminomethyl; and s is 1 to about 20.

11. The curable composition of claim 1, wherein the unsaturated polyester resin is present and is obtained by reaction of at least one polyhydric alcohol with at least one polybasic acid comprising an unsaturated polybasic acid, wherein the unsaturated polybasic acid is selected from the group consisting of maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and their corresponding esters and anhydrides.

12. The curable composition of claim 11 wherein the polyhydric alcohol is selected from the group consisting of ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, bisphenol A, hydrogenated bisphenol A, bisphenol A-alkylene oxide adducts, and tetrabromobisphenol alkylene oxide adducts.

13. The curable composition of claim 1 wherein the vinylester resin is present and based on the reaction product of a bisphenol, an epoxy, and a monocarboxylic acid.

14. The curable composition of claim 1, wherein the reactive liquid monomer is selected from the group consisting of vinyl toluene, styrene, t-butyl styrenes, dibromostyrenes, and combinations thereof.

15. The curable composition of claim 1, wherein a mixture of both a functionalized poly(phenylene ether) and an unsaturated polyester or vinyl ester resin is present, and the ratio of the total amount of functionalized poly(phenylene ether) and unsaturated polyester resin or vinylester resin to the reactive liquid monomer is about 2:1 to about 1:5 by weight.

16. A method for electrically insulating a motor using a varnish composition comprising:
applying a varnish composition according to claim 1 to a motor component; and
curing the varnish composition to form an electrically insulative thermoset coating over the motor component.

* * * * *